(12) United States Patent
Qu et al.

(10) Patent No.: US 9,118,768 B2
(45) Date of Patent: Aug. 25, 2015

(54) TOUCH-FREE PUSH-TO-TALK SWITCH IN TWO-WAY RADIOS AND THE METHOD OF USING THE SAME

(71) Applicant: Anray International Corp., Orange, CA (US)

(72) Inventors: Haijuan Qu, Yorba Linda, CA (US); Liren Lin, Corona, CA (US)

(73) Assignee: Anray International Corp., Orange, CA (US)

( * ) Notice: Subject to any disclaimer, the term of this patent is extended or adjusted under 35 U.S.C. 154(b) by 77 days.

(21) Appl. No.: 14/186,955

(22) Filed: Feb. 21, 2014

(65) Prior Publication Data

US 2015/0133200 A1     May 14, 2015

Related U.S. Application Data

(60) Provisional application No. 61/902,118, filed on Nov. 8, 2013.

(51) Int. Cl.
*H04M 1/00* (2006.01)
*H04M 1/60* (2006.01)
*H04W 4/10* (2009.01)

(52) U.S. Cl.
CPC .............. *H04M 1/6033* (2013.01); *H04W 4/10* (2013.01)

(58) Field of Classification Search
USPC ...................................................... 455/569.1
See application file for complete search history.

(56) References Cited

U.S. PATENT DOCUMENTS 8,095,081 B2 *    1/2012   Vance ........................... 455/90.2

* cited by examiner

*Primary Examiner* — Joel Ajayi
(74) *Attorney, Agent, or Firm* — Ardent Law Group; Anthony King

(57) ABSTRACT

An accessory system for a two-way radio allowing for touch-free push-to-talk (PTT) function, the system includes a detachable accessory to the two-way radio receiver, wherein the accessory can be a headset, an earphone, or a speaker microphone. The system also includes a user-wearable wrist band having a magnet to trigger a magnetic sensor located in the accessory when the wrist band is moved within close proximity to the magnetic sensor, thereby turning on the PTT function.

19 Claims, 5 Drawing Sheets

TOUCH-FREE PUSH-TO-TALK SWITCH IN TWO-WAY RADIOS AND THE METHOD OF USING THE SAME

CROSS-REFERENCE TO RELATED APPLICATIONS

This application claims priority to U.S. Provisional Pat. No. 61/902,118, filed on Nov. 8, 2013, which is hereby incorporated by reference in its entirety. Although incorporated by reference in its entirety, no arguments or disclaimers made in the priority application apply to this application.

BACKGROUND OF THE INVENTION (1) Field of the Invention

The field of the invention is two-way radio systems, or more specifically, accessories to two-way radios that feature a touch-free push-to-talk (PTT) switch along with a wrist band.

(2) Description of Related Art Including Information Disclosed Under 37 CFR 1.97 and 1.98

Two-way radio accessories such as speaker microphone and headsets are well known for various industries and uses. In particular, headsets are desirable in certain working environments so a user can free up his or her hand to perform other tasks. Speaker microphones also offer the same solution since it can be clipped onto a user's uniform (e.g., on the epaulet), thus freeing up the user's hands to perform other tasks. Prior art headset and speaker microphones, however, require the user to press and hold a push-to-talk (PTT) button in order to talk. In a speaker microphone, the PTT button is usually located on the speaker microphone housing. In a headset, the PTT button is usually located on the cable tethering the headset to the two-way radio. The need to press the PTT button is particularly undesirable especially when used in medical or surgical settings. Surgeons, doctors, and dentists often use two-way radios to communicate with other medical staff. Existing accessories to two-way radios require that they press the PTT button with their finger, undesirably causing contamination and cross-contamination.

Therefore, there remains a need for a truly hands-free, touch-free, or touch-less, PTT switch in two-way radios.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The invention may seek to satisfy one or more of the above-mentioned desires. Although the present invention may obviate one or more of the above-mentioned desires, it should be understood that some aspects of the invention might not necessarily obviate them.

BRIEF SUMMARY OF THE INVENTION

The inventive subject matter provides a solution as an option to, or a replacement of, existing PTT buttons.

In the preferred embodiments, the touch-free PTT switch is contemplated to be disposed on the speaker microphone housing, on the headset, or on the cable tethering these accessories to the two-way radio receiver. The contemplated touch-free PTT switch has a sensor. This sensor is designed to sense an activating wrist band. The wrist band contains an activating element such that when it is within close proximity to the sensor, it activates the PTT function, allowing a user to talk.

In one embodiment, close proximity to the sensor means a user must move the wrist band directly above or adjacent to the sensor. A user would move his wrist band close to the sensor in the PTT switch and remain there for as long as he needs the PTT function turned on. That is, having his wrist band in close proximity to the PTT switch sensor is the same as keeping the PTT button pressed down in a prior art device.

The sensor in the PTT housing can be any type of sensor suitable to accomplish this need. For example, it can be a magnetic sensor, and the activating element in the wrist band can be a magnet.

Also contemplated are optional status indicators. In one contemplated embodiment, this is provided by a sound in the ear piece/speaker microphone. For example, a "clicking" sound means it has just been turned on, another "clicking" sound means it has just been turned off. One skilled in the art will recognize that many other sounds can also be implemented, such as beeping sound, double-clicking sound, etc. In less preferred embodiments, LED light is provided to indicate PTT-ON, and PTT-OFF. This is less preferred because a user can be distracted when he or she looks down at the LED indicator light.

Contemplated wrist band can be made of various suitable materials, construction, and configurations. In one preferred embodiment, the band is a commonly known slap wrist band, which has a rubber covering enclosing a metal strap that wraps around a user's wrist by slapping it onto the user's wrist. The rubber covering enables the wrist band for easy sanitization.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

It should be noted that the drawing figures may be in simplified form and might not be to precise scale. In reference to the disclosure herein, for purposes of convenience and clarity only, directional terms, such as, top, bottom, left, right, up, down, over, above, below, beneath, rear, front, distal, and proximal are used with respect to the accompanying drawings. Such directional terms should not be construed to limit the scope of the invention in any manner.

DETAILED DESCRIPTION OF THE INVENTION

The invention and its various embodiments can now be better understood by turning to the following detailed description of the preferred embodiments, which are presented as illustrated examples of the invention defined in the claims. It is expressly understood that the invention as defined by the claims may be broader than the illustrated embodiments described below.

The inventors have discovered a solution to fulfill a long felt need in many industries that use two-way radios but would prefer that they didn't have to press a push-to-talk (PTT) button. However, due to the nature of two-way radio technology, it has always been the case that a user must press and hold a PTT button to talk into the two-way radio. Where accessories such as speaker microphone, earphone, and headsets are used, the user still must press and hold a PTT button, which are provided on the accessories. Law enforcement personnel, kitchen staff, restaurant workers, construction crew, surgeons, doctors, and dentists have been known to benefit from using two-way radios to facilitate communication with co-workers. These users, however, must learn to cope with the inconvenience of pressing and holding the PTT button. It is inconvenient for them because their hands are usually already occupied handling tools. It can also be inconvenient because their hands are gloved, dirty, greasy, or bloody. In addition, when prior art PTT buttons on these accessories are soiled by the user's hands, these buttons cannot be easily cleaned. Especially in medical settings, a dentist wearing surgical gloves and holding tools would have to put down the tool, and take off one glove just so he can press and hold the PTT button. It is important to appreciate that although the present invention is described to be particularly well suited for the above professions and environments, many other uses are also contemplated especially where the user of a two-way radio would benefit from touch-free PTT switch.

In one aspect of the inventive subject matter, the invention is the various accessory systems having the touch-free PTT switch and activating wrist band, for use with a two-way radio receiver. In another aspect of the inventive subject matter, the invention is not just the accessory, but the entire system of a two-way radio receiver and the accessory having a touch-free PTT switch and activating wrist band. Another aspect of the invention centers on the method of using the novel technology and systems as disclosed herein.

Figure 1:
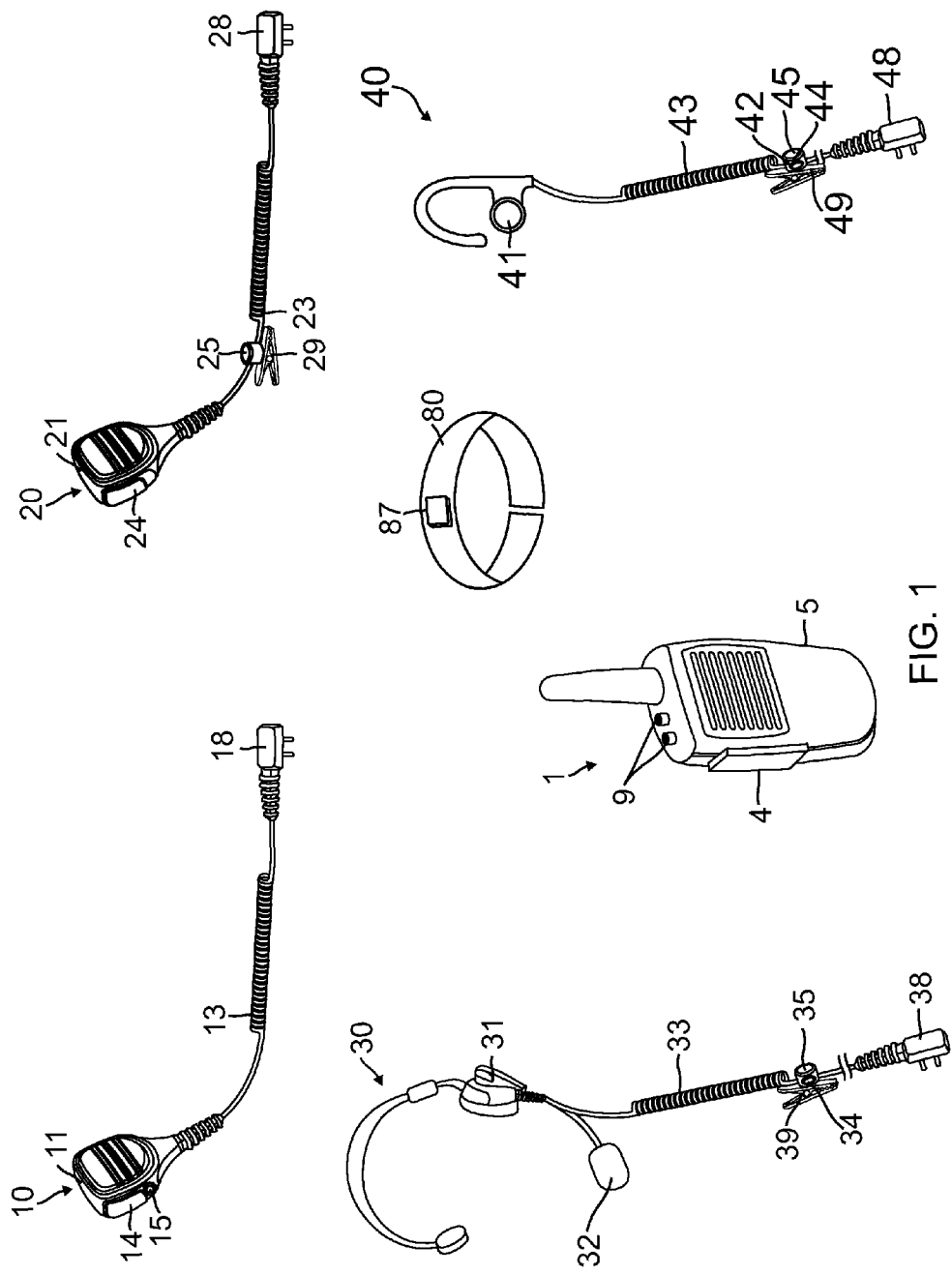
FIG. 1 is a perspective view of a variety of accessories along with a wrist band, all of which are to work with the shown prior art two-way radio receiver according to an aspect of the inventive subject matter.

FIG. 1 generally depicts the various contemplated accessory systems with touch-free PTT function in accordance with the present invention. These contemplated accessory systems include the system of speaker microphones 10 to work with wrist band 80, the system of speaker microphone 20 to work with wrist band 80, the system of headset 30 to work with wrist band 80, and the system of earphone 40 to work with wrist band 80. It is important to appreciate that speaker microphones 10, 20, headset 30, and earphone 40 each would have appropriate connectors to connect to a two-way radio receiver 1 currently available on the market. Such appropriate connectors may be via cables 13, 23, 33, 43, or wirelessly (e.g., UHF, Bluetooth, not shown in the drawings). As those of ordinary skill in the art will recognize, cables 13, 23, 33, 43 may use plugs/contacts of appropriate shapes and configurations as dictated by the particular brand and model of two-way radio receiver available in the market.

Also an important part of any of the above contemplated accessory system is a wrist band 80, designed as an activator to trigger a sensor in the accessory system to turn on and off PTT, as will be described in more details below.

With respect to the sensors 15, 25, 35, 45, it is a magnetic sensor that is capable of sensing a magnet 87 within close proximity Magnetic sensors are known in other industries; any suitable magnetic sensor can be used. In preferred embodiments, close proximity means within 2.5 centimeters; in further preferred embodiments, it means between 1.5 to 2.5 centimeters. It is particularly contemplated, that magnet 87 has suitable strength of magnetism to trigger the sensors 15, 25, 35, 45 only within the closed proximity. Therefore, it is important not to use magnet having too great of a magnetic strength. Magnets that are too strong can undesirably trigger sensors 15, 25, 35, 45 when unintended. Such false alarm can cause embarrassment, or even disclosure of confidential patient information.

In the illustrated example of speaker microphone 10, speaker microphone 10 looks just like a regular prior art speaker microphone on the outside. A magnetic sensor 15 is disposed within the speaker housing. In operation, a user would wear the two-way radio receiver 1 on his belt, plugs connector 18 into receiving socket 9 of two-way radio receiver 1, and clips the speaker microphone onto his or her epaulet. So when the user needs to talk, he/she would press and hold the PTT button 14 (as typically seen in prior art devices), or simply move his/her wrist wearing the wrist band 80 closer to the speaker microphone. Once the wrist band 80 is in close proximity and kept in that close proximity, PTT is turned on. At this point the speaker microphone can electronically communicate with the radio receiver 1 by transmitting a voice to and from the user.

Figure 8:
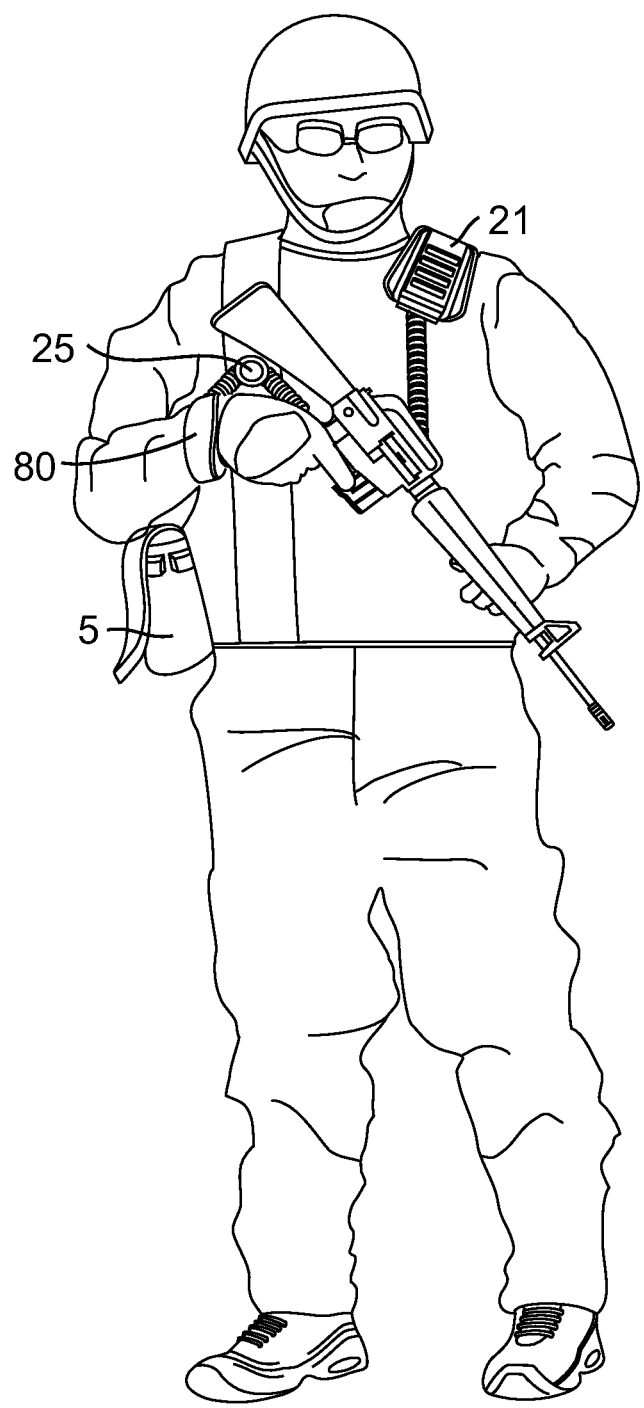
FIG. 8 is an illustration of one embodiment of the inventive subject matter being used by a tactical operations police officer holding a rifle in a ready position commonly known as Sling Ready or Patrol Ready.

The speaker microphone 20 as shown in FIG. 1 is slightly different from speaker microphone 10 in that its magnetic sensor 25 is not located in the speaker housing, but somewhere on the cable 23. This arrangement can be particularly helpful because a user would not have to move his or her wrist all the way up to the epaulet to turn on PTT (see FIG. 8). Here, as the speaker microphone is clipped onto his or her epaulet, and the cable naturally hangs down, or strategically placed, the magnetic sensor 25 (which can have a clip to clip onto the user's clothing) now hangs right around the user's chest/stomach region, and the user would only need to move his or her wrist slightly higher than where his or her hand was while working on whatever he is working on. This is particularly useful for law enforcement personnel. As illustrated in FIG. 8, a tactical operations police officer is holding a rifle in a ready position commonly known as Sling Ready or Patrol Ready. His left hand being the support hand, and his right hand is on the trigger. Speaker microphone 21 is clipped on his left epaulet, and cable 23 is strategically placed that runs to the right side of his chest, thereby positioning sensor 25 on the right side of his chest with a clip. To turn on the PTT function, the officer can simply move his right wrist (wearing wrist band 80) upward a little, while both hands are still on his rifle, ready to fire when necessary. This is also particularly useful in other tactical shooting ready positions while searching for a target, or approaching a target area at a fast pace. Here, the police officer would not need to free up one hand and reach all the way up to his left or right epaulet just to turn on PTT.

Referring now to headset 30 in FIG. 1, headset 30 has the appearance of a typical headset for a two-way radio receiver. Headset 30 has a head band attached to a speaker 31, which is coupled to a microphone boom with a microphone tip 32. It has a cable 33 to connect to the two-way radio receiver 1 via connecting plug 38. On the cable 33 and at some distance from the speaker 31, a PTT button 34 along with a clothes clip 39 is provided. In accordance with the invention, a sensor 35 is disposed within the housing that houses the PTT button 34.

The sensor 35 is contemplated to be a magnetic sensor, to work with the wrist band 80. Alternatively, the PTT button is only optional.

As for earphone 40 in FIG. 1, earphone 40 also has the appearance of a typical earphone for a two-way radio receiver. Earphone 40 has a speaker 41, an optional hook to attach around a user's ear, and cable 43 to connect to the two-way radio receiver 1 via connecting plug 48. On the cable 33 and at some distance from the speaker 41, a PTT button 44, a microphone 42, along with a clothes clip 49 is provided. In accordance with the invention, a sensor 45 is disposed within the housing that houses the PTT button 44. The sensor 45 is contemplated to be a magnetic sensor, to interact with the wrist band 80.

Figure 2:
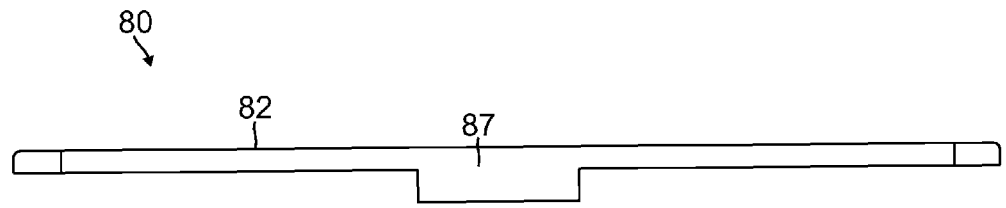
FIG. 2 is a side view of the wrist band.
Figure 3:
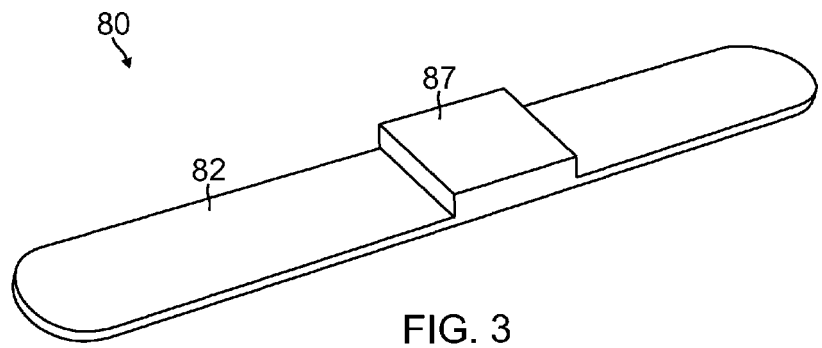
FIG. 3 is a side perspective view of the wrist band of FIG. 2.
Figure 4:
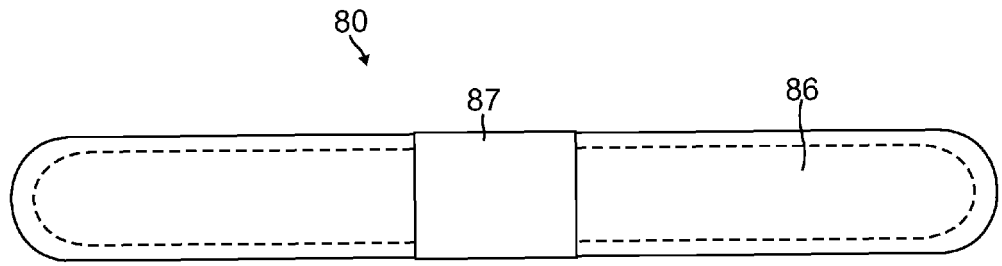
FIG. 4 is a top view of the wrist band of FIG. 2.

As will be illustrated in connection with FIGS. 2-4, the wrist band 80 comprises a band 82 and an activating element 87. In a preferred embodiment, the activating element 87 is a magnet. As shown in FIGS. 2-4, the wrist band 80 is advantageously enhanced by including a metal strap 86 embedded within an outer coating, making wrist band 80 a slap wrist band, so a user may easily attach and detach it from his or her wrist. A slap wrist band is a type of wrist band known for having a flat sheet of metal band with an arcuate cross-section, when the band is in a straight configuration. When the convex side of the band is slapped against a wrist, the metal band quickly twists upon itself wrapping the wrist in its process.

The outer coating of the wrist band may be made of any suitable material. For example, in medical setting, the outer coating is polyurethane or any other material that can be easily sanitized.

Manufacturing cost of the wrist band 80 can be relatively low in some embodiments. It can be simply a band with a simple magnet enclosed. In this way, the wrist band 80 can even be disposable, so as to save users the trouble of sanitizing them.

FIGS. 2-4 illustrate an embodiment where the magnet 87 is generally disposed in the center of the band. Other configurations are also contemplated so long one or more magnets are provided on the band 82 to make it easier for a user to trigger the magnetic sensor in the accessory system.

As discussed above, many uses of this system are contemplated especially where a user would benefit from touch-free PTT activation. This may include kitchen staff, construction crew, cyclists, skiers, police officers, hotel janitorial staff, medical personnel, particularly surgeons and dentists.

Figure 5:
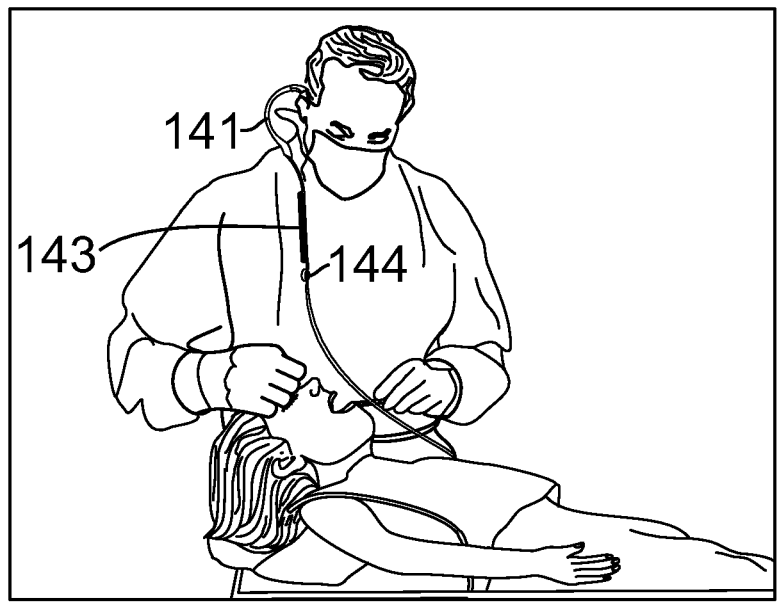
FIG. 5 is an illustration of a dentist at work wearing a prior art earphone.
Figure 6:
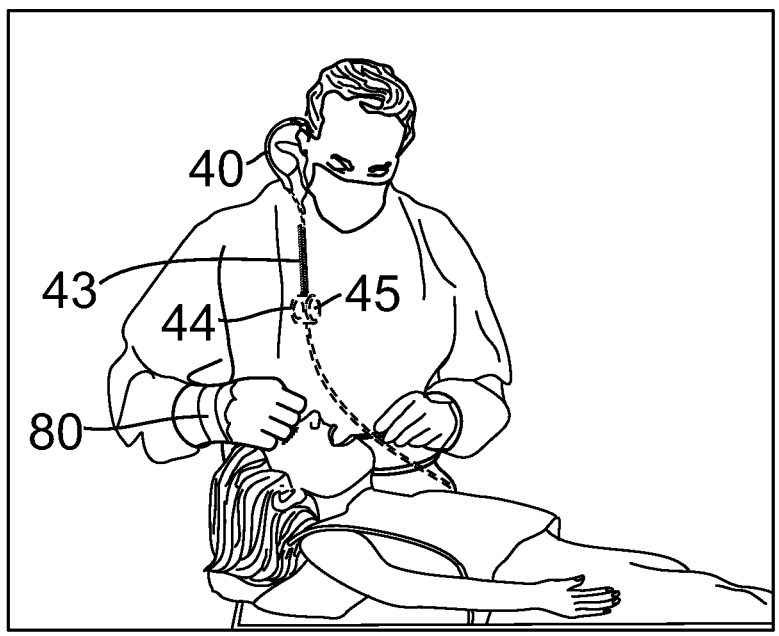
FIG. 6 is an illustration of a dentist at work wearing one embodiment of the earphone in accordance to an aspect of the inventive subject matter.
Figure 7:
FIG. 7 is an illustration of the dentist of FIG. 6 wearing the earphone of FIG. 6, activating the PTT switch in accordance to an aspect of the inventive subject matter.

FIGS. 5-7 illustrate a dentist using a two-way radio to communicate with his staff. In FIG. 5, a dentist is shown wearing a prior art earphone on his ear, with its cable 143 dangling on the outside of his medical uniform (i.e., scrub). On the cable 143, about 30 centimeters down from the speaker 141 of the earphone is a housing with a PTT button 144. The cable 143 is connected to a prior art two-way radio (not shown) clipped on his belt or placed in his pocket. The PTT housing usually has a clothes clip to clip onto the edge of shirt, pocket, or collar. Here, the medical uniform has no edge to clip onto, so the PTT button 144 is left dangling in front of his chest. When the dentist leans over to work on the patient, the PTT button 144 can swing forward and undesirably touch the patient's face. The dentist, therefore, would have to try to clip the PTT housing onto the medical uniform somehow. In the process of clipping, re-clipping, re-adjusting location of the PTT housing, the dentist has touched the PTT housing numerous times with his gloved hands, thus contaminating the PTT housing and his gloved hands. When the dentist needs to talk, he would again contaminate the PTT housing by pressing and holding the PTT button 145. Alternatively, the dentist may take off his gloves every time he needs to touch the PTT button 145, but such solution takes up time and causes unwanted interruptions.

FIGS. 6 and 7 illustrate a dentist using one embodiment of the present invention in combination with a prior art two-way radio (not shown). In FIG. 6, a dentist wearing a medical uniform is shown treating a patient. The dentist wears an earphone 40 on his right ear, and the earphone 40 has a cable 43 connecting the earphone speaker to the prior art two-way radio, which can be clipped on his belt or placed in his pocket. Notice the cable 43 (in dash line) is placed inside of the medical uniform and not visible from the outside. On the cable 43, about 30 centimeters down from the earphone speaker is a PTT housing having a magnetic sensor 45. The PTT housing may or may not have a clothes clip. The PTT housing can optionally have a PTT button 44 so if the dentist wishes to press and hold it through the medical uniform, he can. The PTT housing also has a microphone 44, so when the PTT function is turned on, the dentist can speak into it and sound would pass through the medical uniform into the microphone 44. The dentist wears wrist band 80 on his right wrist. The dentist has both gloved hands working on the patient's teeth.

Referring now to FIG. 7, when the dentist from FIG. 6 needs to call his staff at the front desk, he simply hovers his right wrist over the magnetic sensor 45 (not shown, as it is under the uniform and blocked by his arm) with a tool still in his right hand. In this particular illustration, the cable does not dangle in front of the patient's face, and the dentist need not find a way to clip the PTT onto the medical uniform, and no contamination was caused in the process. The dentist also benefits from not having to put down his tool and gloves just to turn on the PTT function.

Even though the embodiment as described above and illustrated in FIGS. 6 and 7 is used under the dentist's uniform, one of ordinary skilled in the art would recognize that the same embodiment can also be used outside of the dentist's uniform. This is particularly appropriate when the uniform is made of material that hinders transmission of sound. In those cases, the microphone might experience trouble picking up sound from the user.

Similarly, one skilled in the art would appreciate that restaurant workers and kitchen staff, who often have soiled hands, would benefit greatly from the above-mentioned accessories.

Also similarly, law enforcement officers often cannot afford to free up one hand to reach up to press and hold a PTT button near his epaulet because he may be holding a gun or restraining an arrestee, or busy conducting other businesses that requires full attention of both hands, would especially benefit from the contemplated embodiments described herein.

Although this specification specifically discloses the embodiments of speaker microphones 10, 20, headset 30, and earphone 40, the same idea and method can be implemented on various other accessories known or yet to be known for the use of the PTT function.

Also, as for communication methods between the contemplated accessories and the two-way radio receiver, the embodiments as described are directly connected and plugged into to a two-way radio by cable 13, 23, 33, 43. Many other known or yet to be known methods of signal transmission can be used, such as wireless methods (e.g., via Bluetooth, UHF).

One of the key elements of the instant invention is the ability to sense the wrist band 80 within close proximity, without physically contacting or touching a PTT button. This, as described above, is made possible by a magnetic sensor 15, 25, 35, 45. Other types of sensor may be used, such as proximity sensors, IR sensors, can be used as long as the same touch-free feature can be achieved. One skilled in the art would immediate appreciate the type of electrical designs necessary to implement a sensor for turning on and off a PTT function.

As discussed and illustrated in the drawing figures, there are various contemplated locations suitable for placing the sensor 15, 25, 35, 45. The location of the sensor is highly depended on the type of user environment. For most, it is most convenient to have the sensor located in front of the chest or stomach region, when the accessory is wore as intended (clipped on the epaulet, worn on the ear, worn on the head). In some situations, it may be more suitable to have the sensor located near the waist of the user. In other situations, it may be more suitable to have the sensor located near the forearm of the user. Still yet in other situations (e.g., cyclist or motorcycle riders), it may be best to have the sensor located near the thigh of the user while riding.

Flexibility in where the sensor 15, 25, 35, 45 can be placed is depended on how long the cable 13, 23, 33, 43 is, or whether the signal transmission is by wireless methods. Therefore, various lengths of cables 13, 23, 33, 43 are specifically contemplated to enable such flexibility.

Throughout most the specification above, a wrist band 80 having an enclosed magnet 87 is used as the activator of magnetic sensor 15, 25, 35, 45. This is perceived to be the most preferably form of activator because the contemplated novel method of moving a wrist band over the PTT switch mostly simulates well known and well used gesture of moving one's hand over to press and hold the PTT button. Therefore, using the novel wrist band requires considerably less user learning and training.

The invention also contemplated having more than just one magnet 87 in the wrist band 80. There can be multiple pieces of magnets 87 disposed on or in the wrist band 80. Alternatively, it can be one or multiple stripes of magnet 87.

Other types of user-wearable activator types are also contemplated. For example, instead of a wrist band, it can be a ring, or a tag (with clothes clip/pin), a bracelet, or even a self-adhesive patch containing a magnet, a group of magnets, or stripes of magnets.

In one preferred aspect of the inventive subject matter, the wrist band 80 material comprises a polyurethane coating. Still further contemplated alternative suitable materials include plastic, metal, nonmetal fibrous material, or any material suitable for cleaning by alcohol or other cleaning agents, or suitable for repeated sanitation. In the most preferred embodiments, the wrist band is water resistant. Additionally, it should be appreciated that the materials contemplated herein may be derivatized in numerous manners. The contemplated wrist band 80 can be made of suitable materials to withstand temperature extreme and the chemical environment, such materials include natural and synthetic polymers, various metals and metal alloys, naturally occurring materials, textile fibers, ceramic materials, and all reasonable combinations thereof.

It is known in the art that the PTT status can be indicated by a sound. This is done usually in commercial two-way radios of 7.2 volts. The sound can be a clicking sound or a beeping sound, or any type of audible indicator transmitted through the speaker of the accessory and/or speaker of the two-way radio receiver. This same type of audible indicator and all necessary and known circuits and electronics to effectuate the alert are especially contemplated to be implemented in the instant embodiments. For two-way radios lower than 7.2 volts, for example, 3.7 volts two-way radios, such sound indicator is usually not available due to simplified component design in the system. Nevertheless, contemplated designs of the instant invention include such optional LED or sound status indicator, by having necessary electrical component to supports such function.

Optionally and less preferably, the indicator can be a LED light indicator.

The contemplated optional indicator can be disposed on any part of the accessory, including somewhere on the cable.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

As for the words "push-to-talk," or the acronym PTT, although the words on its face suggests that a "push" action is to be performed or required, the instant invention is using the acronym PTT to signify that the invention is intended to perform the functions of known PTT switches, although without actually touching any physical components of the accessory. Therefore, the enclosed embodiments of PTT switch actually does not require a physical "push" action, and does not require a physical touch/press/hold action.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Thus, specific embodiments and applications of touch-free PPT switch have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the invention. In addition, where the specification and claims refer to at least one of something selected from the group consisting of A, B, C . . . and N, the text should be interpreted as requiring only one element from the group, not A plus N, or B plus N, etc.

What is claimed is:

1. An accessory system to a two-way radio receiver to provide touch-free push-to-talk (PTT) function without requiring a user to physically touch a PTT button, said accessory system comprising:
   an accessory being either a headset, an earphone, or a speaker microphone capable of electronically communicating with the radio receiver by transmitting a voice to and from the user;
   a speaker for transmitting a sound to the user;
   a cable tethering from the speaker;
   a sensor disposed on the accessory, or on the cable, capable turning on the PTT function without a user physically touching the PTT button; and
   a wrist band;
   a user-wearable activator disposed on the wrist band capable of causing the sensor to turn on the PTT function, when the user selectively moves the user-wearable activator within a close proximity to the sensor.

2. The accessory system to a two-way radio receiver as recited in claim 1, wherein the sensor is a magnetic sensor.

3. The accessory system to a two-way radio receiver as recited in claim 2, wherein the user-wearable activator comprises a magnet.

4. The accessory system to a two-way radio receiver as recited in claim 3 further providing an indicator disposed on at least one of said accessory and cable, to indicate a status of the PTT function.

5. The accessory system to a two-way radio receiver as recited in claim 4, wherein the indicator produces a second sound to indicate a PTT-ON status, and a third sound to indicate a PTT-OFF status.

6. The accessory system to a two-way radio receiver as recited in claim 4, wherein the indicator is a LED.

7. The accessory system to a two-way radio receiver as recited in claim 3, wherein the wrist band can be sanitized and re-used.

8. The accessory system to a two-way radio receiver as recited in claim 3, wherein the wrist band is disposable.

9. The accessory system to a two-way radio receiver as recited in claim 7, wherein the wrist band is a slap wrist band having a metal strap.

10. The accessory system to a two-way radio receiver as recited in claim 7, wherein the wrist band is water-resistant.

11. A two-way radio system comprising the accessory system of claim 7.

12. A method of touch-free activation of push-to-talk (PTT) function in a two-way radio accessory for medical personnel, janitorial staff, law enforcement personnel, athletes, kitchen staff, construction crew, cyclists, skiers, or anyone who desires said touch-free activation of PTT function, said method comprising:
   providing an accessory capable of coupling to a two-way radio receiver, wherein the accessory is an earphone, a headset, or a speaker-microphone;
   wherein the accessory has a speaker to transmit a sound to the user;
   providing a cable coupled to the speaker and electronically communicate with the two-way radio receiver;
   providing a sensor disposed on at least one of said accessory and cable; and
   providing a wrist band to be worn by a user, wherein the wrist band has a user-wearable activator capable of causing said sensor to turn on the PTT function by moving the activator within a close proximity to the sensor, without the user touching a PTT button.

13. The method as recited in claim 12 wherein the sensor is a magnetic sensor, and the activator comprises a magnet enclosed in the wrist band.

14. The method as recited in claim 13 furthering comprising allowing said wrist band to be sanitized and reused.

15. The method as recited in claim 13 furthering comprising allowing said wrist band to be disposable.

16. The method as recite in claim 15 provided that the wrist band is a slap wrist band.

17. The method as recited in claim 14 further providing an indicator on at least one of said receiver and said accessory, to indicate to a user of a PTT-ON status.

18. The method as recited in claim 17, wherein the indicator is a LED light.

19. The method as recited in claim 17, wherein the indicator is a second sound.

* * * * *